March 17, 1959

C. O. JORGENSEN 2,877,948

ANALOGUE DIVIDER

Filed March 23, 1953

INVENTOR:
Clinton O. Jorgensen

By Herbert E. Metcalf
His Patent Attorney

United States Patent Office 2,877,948

Patented Mar. 17, 1959

2,877,948

ANALOGUE DIVIDER

Clinton O. Jorgensen, Long Beach, Calif., assignor to Northrop Aircraft, Inc., Hawthorne, Calif., a corporation of California Application March 23, 1953, Serial No. 344,093

1 Claim. (Cl. 235—61)

The present invention relates generally to analogue dividers and more particularly to an analogue divider circuit using a feedback amplifier.

The general equation of a feedback amplifier is $$E_o=\frac{AE_i}{1-AB}=\left[-\frac{1}{B}\left(\frac{1}{1-\frac{1}{AB}}\right)\right]E_i$$

where, $E_i$=input voltage
$E_o$=output voltage
$A$=voltage gain of amplifier
$B$=feedback fraction.

By employing a high gain amplifier, the feedback factor AB can be made large such that the quantity $1/AB$ is negligible. Using degenerative feedback will yield a negative B and the preceding equation can be effectively reduced to $$E_o=\frac{E_i}{B}$$

The amplifier output can thus be made independent of the gain A.

From this latter equation, it can be seen that in making the input voltage $E_1$ proportional to a variable and having the feedback fraction B be proportional to another variable, the output voltage $E_0$ is proportional to the quotient of the first variable divided by the second.

It is an object of this invention to provide means for physically dividing electrically represented quantities involving linear and angular measurements.

Another object of the invention is to provide means for preventing sustained oscillation in an analogue divider circuit using a feedback amplifier.

Another object of the invention is to provide impedance matched components in a divider circuit.

A further object of the invention is to provide means for incorporating an angular function into a divider circuit.

The foregoing and other objects are preferably accomplished by providing a high gain amplifier coupled through a cathode follower circuit for example, to a sine-cosine generator, the output of which is negatively fed back to the input of the amplifier. An angular variable (sin $\theta$ or cos $\theta$) can be put into the circuit by setting the adjustable generator rotor to a desired angle, and magnitudes of another variable can be electrically represented by input voltages to the amplifier. Output voltages are proportional to the quotient of the input voltage represented variable and the angular variable, due to the high gain of the amplifier. A single-frequency null network is connected from the amplifier output back to the input providing negative feedback to prevent oscillation at frequencies for which the phase shift of the divider would cause regeneration.

The invention will be more fully understood by reference to the accompanying drawings, in which.

Figure 1:
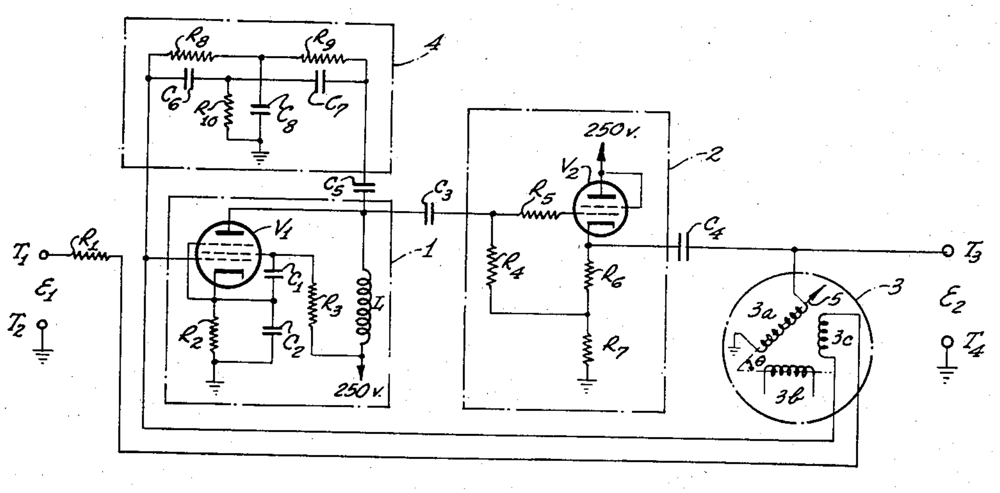
Figure 1 is a circuit diagram of a preferred embodiment of the invention.

Referring first to Figure 1, there is shown a circuit of a preferred analogue divider. The analogue divider comprises four major component sections, these being an amplifier 1, cathode follower 2, sine-cosine generator 3, and a single-frequency null network 4, connected as shown. The construction and use of these elements are well known to those skilled in the art.

Amplifier 1 is driven for example by a 400 cycle signal $E_1$. The amplitude of signal $E_1$ which is proportional to the magnitude of a variable can be preferably varied between 0 and approximately 6 volts and is supplied at input terminals $T_1$ and $T_2$. The gain of amplifier 1 without feedback is approximately 250 and is sufficient to make the above, last-said equation accurate for this circuit over a wide range.

The output of amplifier 1 is coupled to input winding *3a* of sine-cosine generator 3 through a cathode follower 2. Cathode follower 2 is used particularly to match the output impedance of amplifier 1 to the low input impedance of sine-cosine generator 3 and to improve response characteristics of the circuit.

The input winding *3a* is wound on the rotor of sine-cosine generator 3 and can be rotated mechanically to an angle $\theta$ from an index position. This is schematically indicated in Figure 1 by arrow 5 drawn on the axis of winding *3a* and an angle $\theta$ which is referenced to the axis of winding *3b*. In index position, winding *3a* is electrically aligned with fixed winding *3b*. Fixed windings *3b* and *3c* are wound on the stator of sine-cosine generator 3 at 90 electrical degrees phase difference. These are the cosine and sine windings of generator 3, respectively, and are shown schematically positioned in Figure 1 at right angles to each other. Cosine winding *3b* is not used in this instance and is left disconnected; however, sine winding *3c* is connected in series with the input grid of amplifier 1. This connection is such as to provide a negative feedback voltage from sine-cosine generator 3 into the input of amplifier 1 that is proportional to the product of the amplifier output voltage and the sine of the angular displacement $\theta$ of rotor shaft from index position. The rotor angle $\theta$ determines the amount of amplifier voltage fed back by transformer action through sine winding *3c*, and the variable sin $\theta$ is thus the feedback fraction B.

The circuit is oscillatory when the quantity sine $\theta$ becomes negative and it is for this reason rotation of the shaft (rotor) of the sine-cosine generator 3 is preferably constrained within the limits of 0° and 180°. This can be accomplished by small, projecting stop pins suitably affixed on rotor shaft and stator frame to limit rotor travel, for example.

A parallel-T, R-C network 4, tuned to a null at 400 cycles, or any other band restricting network, is connected between the output and input of amplifier 1 to prevent oscillation at all frequencies for which the total phase shift of the divider causes regeneration. This connection provides a large amount of negative feedback of all other frequencies such that all but frequencies close to 400 cycles for instance, are completely degenerated at the input. In this way only the 400 cycle operating frequency, or any non-regenerative frequency as allowed by a band restricting network, is passed through to the sine-cosine generator 3.

The parallel-T feedback voltage is divided between the high impedance of the parallel-T network and the grid-cathode impedance of the amplifier circuit. In order that a reasonable portion of this voltage will appear across the grid circuit of the tube, it is necessary that the input signal have a fairly high source impedance, in this case, $R_1$ insures this condition.

The output of cathode follower 2 is connected to output terminals $T_3$ and $T_4$, and is the output for the analogue divider. Output voltage $E_2$ measured across output terminals $T_3$ and $T_4$ by a voltmeter (not shown), for example, is a voltage proportional to the input quantity represented by input voltage $E_1$ divided by the sine of the angular displacement $\theta$ set into the divider circuit by the mechanical setting of rotor winding *3a* from index position. This adjustment can be facilitated for example, by attaching a knob and pointer on the rotor shaft so that the pointer indicates against a fixed dial mounted on the stator housing about the rotor shaft. The dial can be suitably calibrated in degrees, reading from 0° to 180°, where 0° corresponds to index position.

While the invention has been described as having variable divisor sin $\theta$, use of the cosine stator winding or other similarly generated functions can provide other variables as divisors. It is further apparent that various configurations of combination can be readily obtained from a plurality of dividers connected in series and/or parallel to perform a variety of functions in computation. It should also be noted that the described components and combinations thereof can have mechanical analogues which are counterparts of the same invention.

Figure 2:
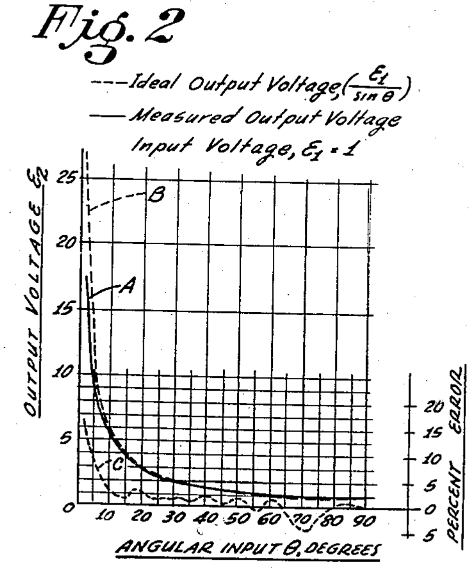
Figure 2 is a graph showing performance curves, for a constant input voltage, of a preferred analogue divider.

The curves of Figure 2 graphically portray performance characteristics of the analogue divider for a constant unit input voltage $E_1$. The output voltage $E_2$ is plotted as a function of the angular input $\theta$ for values from 0° to 90°. This is given as curve A. The ideal output voltage versus angular input $\theta$ is shown as curve B (in broken lines) and the percentage error between measured output voltage and ideal is plotted as curve C. With an amplifier gain of 250, for example, the accuracy of the divider is high for values of $\theta$ between 5° to 90° and is approximately equal to the accuracy of the sine-cosine generator. The characteristic curves for values of $\theta$ from 90° to 180° have not been shown since they are virtually mirror images of those illustrated for values from 0° to 90°.

Figure 3:
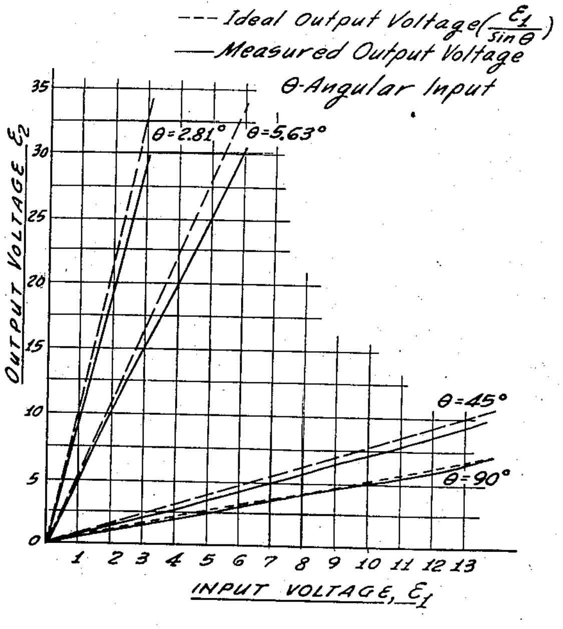
Figure 3 is a graph illustrating performance characteristics of a preferred analogue divider, in this instance for constant values of angular input.

Performance characteristics of the analogue divider for constant angular input are shown in Figure 3. Several curves of output voltage $E_2$, for different constant values of $\theta$=2.81°, 5.63°, 45°, and 90°, are plotted as a function of input voltage $E_1$. There are also shown curves, for the same different constant values of $\theta$, of ideal output voltage (in broken lines) plotted in Figure 3 as a function of the input voltage $E_1$. Except when $\theta$ is small, the accuracy of the divider is high as may be seen by comparing measured output voltage with the ideal.

Typical component values have been tabulated in the following table wherein the identifying reference letters refer to elements similarly denoted in Figure 1.

| | | |
|---|---|---|
| $R_1$ | megohm | 0.5 |
| $R_2$ | ohms | 68 |
| $R_3$ | kilohms | 24 |
| $R_4$ | megohm | 0.47 |
| $R_5$, $R_{10}$ | do | 0.1 |
| $R_6$ | ohms | 390 |
| $R_7$ | do | 1240 |
| $R_8$, $R_9$ | megohm | 0.2 |
| $C_1$ | mfd | 20 |
| $C_2$ | mfd | 100 |
| $C_3$ | mfd | 0.1 |
| $C_4$, $C_5$ | mfd | 1 |
| $C_6$, $C_7$ | mfd | .002 |
| $C_8$ | mfd | .004 |
| L | h | 25 |
| $V_1$ | | 6AU6 |
| $V_2$ | | 6AQ5 |

It should be understood, however, that the invention is not limited to the specific features shown, but that the means and construction herein disclosed comprised the preferred form of several modes of putting the invention into effect and the invention is, therefore, claimed in any of its forms or modifications within the legitimate and valid scope of the appended claims.

What is claimed is:

An analogue divider for physically dividing an electrically represented first variable by a second, comprising: a high gain electronic amplifier having an input and an output; input circuit means for connecting an A. C. voltage proportional in magnitude to said first variable to said amplifier input; a cathode follower output stage connected to said amplifier output for providing a divider output voltage from said output stage; feedback means connected between the output of said output stage and said amplifier input to provide negative feedback of a large fraction of said divider output voltage to said amplifier input, said output voltage being thereby connected to the input of said feedback means, said feedback means comprising a sine-cosine generator having the rotor winding thereof connected to the output of said cathode follower and having a fixed stator winding thereof connected to said input circuit means; means for varying said feedback fraction in proportion to said second variable to make said divider output voltage from said output stage proportional to the quotient of said first variable divided by said second variable, said latter means being the mechanically rotatable rotor of said sine-cosine generator; and a parallel-T single-frequency null network connecting said amplifier output to said amplifier input, the null being tuned to the operating frequency of the A. C. input voltage for substantial negative feedback of all other frequencies except the operating frequency band of said A. C. input voltage, whereby amplifier oscillation is prevented.

References Cited in the file of this patent

UNITED STATES PATENTS

| | | |
|---|---|---|
| 2,245,365 | Riddle | June 10, 1941 |
| 2,467,646 | Agins | Apr. 19, 1949 |
| 2,535,250 | Allen | Dec. 26, 1950 |
| 2,581,456 | Swift | Jan. 8, 1952 |
| 2,584,386 | Hare | Feb. 5, 1952 |
| 2,646,218 | Newell et al. | July 21, 1953 |